United States Patent
Nishino

(10) Patent No.: US 7,301,312 B2
(45) Date of Patent: Nov. 27, 2007

(54) SWITCHING POWER SUPPLY UNIT FOR GENERATING AN OUTPUT VOLTAGE STEPPED UP FROM AN INPUT VOLTAGE

(75) Inventor: Tatsuki Nishino, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 297 days.

(21) Appl. No.: 10/959,018

(22) Filed: Oct. 4, 2004

(65) Prior Publication Data

US 2005/0077882 A1    Apr. 14, 2005

(30) Foreign Application Priority Data

Oct. 8, 2003   (JP)  ............................. 2003-349014

(51) Int. Cl.
*G05F 1/613*    (2006.01)
(52) U.S. Cl. .................. 323/222; 323/284; 361/18
(58) Field of Classification Search ................ 323/222, 323/282, 284, 285; 361/18
See application file for complete search history.

(56) References Cited

U.S. PATENT DOCUMENTS 5,359,281 A * 10/1994 Barrow et al. .............. 323/284
6,185,082 B1 * 2/2001 Yang ............................ 361/90
6,936,997 B2 * 8/2005 Mullett ....................... 323/222
7,119,521 B2 * 10/2006 Ishii et al. .................. 323/222

FOREIGN PATENT DOCUMENTS

JP     2001-008446       1/2001

* cited by examiner

*Primary Examiner*—Jeffrey Sterrett
(74) *Attorney, Agent, or Firm*—Hogan & Hartson LLP

(57) ABSTRACT

A step-up switching power supply unit for generating a predetermined output voltage through a feedback control of its output voltage based on a first detection voltage indicative of the output voltage. The power supply unit is adapted to monitor a second detection voltage associated with the output voltage that is compared with a reference voltage. Open-circuit malfunction arising from, for example, connection failures within the power supply unit can be detected by determining whether the second detection voltage is lower than the reference voltage or not. In the event that open-circuit malfunction has taken place, the switching signal controlling the power supply unit is promptly stopped, thereby preventing abnormal rise of the output voltage (i.e. over-voltage).

9 Claims, 2 Drawing Sheets

SWITCHING POWER SUPPLY UNIT FOR GENERATING AN OUTPUT VOLTAGE STEPPED UP FROM AN INPUT VOLTAGE

FIELD OF THE INVENTION

This invention relates to a switching power supply unit for generating an output voltage stepped up from an input voltage supplied from an external power supply such as a battery by switching the input voltage in accord with a reference voltage. The invention also relates to a semiconductor integrated circuit (IC) for use with the switching power supply unit.

BACKGROUND OF THE INVENTION

There has been known a switching power supply unit generating a required output voltage by repeatedly switching on and off an input voltage impressed on a coil to step up the input voltage, and by rectifying and smoothing the resultant voltage with a diode and a capacitor. This switching power supply unit is controlled by a feedback system in which a feed back voltage proportional to the output voltage balances out a reference voltage. Thus, the output voltage is controlled to remain at a predetermined level (constant-voltage control).

Such constant-voltage control of a switching power supply unit is carried out by an IC designed for this purpose (said IC hereinafter referred to as IC). However, the IC tends to raise the output voltage above the predetermined level in cases where, for example, a voltage division circuit generating the feedback voltage or an external rectification diode have (has) becomes open on account of connection failure, and where the output circuit of the switching power supply unit has become short-circuited, because the feedback circuit judges then that the output voltage is insufficient. As a consequence, the switching power supply unit presents a problem that it outputs abnormally high voltage and/or excessively large current.

In order to protect the switching power supply unit, some switching power supply units utilizing a step-up transformer are adapted to monitor the output voltage to detect an abnormal load condition (e.g. arc discharge). This type of switching power supply unit detects an abnormal load condition when the currently monitored value is below a predetermined threshold value indicative of abnormality of a load and is larger than the last monitored value. When such abnormal load condition is detected twice in succession, the duty of the PWM signal controlling the power supply unit is minimized (Japanese Patent Application Laid Open No. 2001-008446).

In the switching power supply unit as disclosed in the cited literature, it is necessary to detect the level of the output voltage that is currently below the predetermined threshold level but is larger than the previously monitored level. Thus, monitoring of the output level is necessary at least three times for detection of abnormality, which can result in a delay in the detection.

Moreover, it is necessary to define an abnormal level of the output voltage to be detected (i.e. threshold of the output voltage) in accordance with an individual load condition, which, however, requires tedious procedures.

SUMMARY OF THE INVENTION

It is therefore an object of the invention to provide a step-up switching power supply unit for generating a predetermined output voltage through a feedback of the output voltage, the power supply unit capable of promptly responding to an open-circuit malfunction within the power supply unit, thereby preventing abnormality such as over-voltage from occurring.

It is another object of the invention to provide means for detecting the occurrence of malfunction in the power supply unit on the basis of a fixed threshold level of the output voltage, independently of the conditions of the load connected to the unit.

In accordance with one aspect of the invention, there is provided a switching power supply unit comprising:

a voltage conversion circuit for outputting a predetermined output voltage by converting an input voltage to the output voltage in accordance with a switching signal supplied, but for outputting an output voltage close to the input voltage when the switching signal is not supplied;

a control circuit for outputting the switching signal controlled in association with the voltage difference between a first detection voltage in accord with the output voltage and a first reference voltage such that the first detection voltage becomes equal to the first reference voltage; and a malfunction detection circuit, adapted to compare a second detection voltage in accord with the output voltage with a second reference voltage; and generate and supply to the control circuit a malfunction detection signal to stop supplying the switching signal when the second reference voltage exceeds the second detection voltage.

The voltage conversion circuit includes:

a coil;

a switching means that is connected in series with the coil and is on-off controlled by the switching signal; and a rectifying and smoothing circuit for rectifying and smoothing the voltage at the serial node of the coil and switching means.

The second reference voltage may be set to a level in accord with the input voltage. The malfunction detection circuit is provided with a comparator for comparing the second detection voltage and second reference voltage to generate the malfunction detection signal.

The first reference voltage may be increased gradually from a starting voltage to a predetermined voltage in response to a start signal. The control circuit may output the switching signal with its duty ratio controlled by the difference voltage. The first and second detection voltages may be the same in magnitude.

The switching power unit may be provided with an alarm means for alarming the generation of a malfunction detection signal generated.

In accordance with another aspect of the invention, there is provided an IC for use in a switching power supply unit, for outputting a predetermined output voltage by converting an input voltage to the output voltage in accordance with a switching signal supplied, but for outputting an output voltage close to the input voltage when the switching signal is not supplied, the IC comprising:

a switch means that is on-off controlled by the switching signal;

a control circuit for outputting the switching signal controlled in association with the voltage difference between a first detection voltage in accord with the output voltage and a first reference voltage such that the first detection voltage becomes equal to the first reference voltage; and a malfunction detection circuit, adapted to compare a second detection voltage in accord with the output voltage with a second reference voltage; and generate and supply to the control circuit a malfunction detection signal to stop supplying the switching signal when the second reference voltage exceeds the second detection voltage.

The switch means may be connected in series at one switch terminal thereof with a coil, and the voltage appearing at the switch terminal may be provided as the output voltage by rectifying and smoothing the voltage.

The second reference voltage may be set to a level in accord with the input voltage.

A step-up switching power supply unit for outputting a predetermined output voltage by feeding back the output voltage in accordance with the invention monitors the second detection voltage indicative of the output voltage. By detecting a condition that the second detection voltage has become lower than the level of the second reference voltage which is set a little lower than the input voltage (or lower than a voltage associated with the input voltage), open-circuit malfunction arising from connection failure may be detected. Since the switching signal is promptly stopped upon detection of a malfunction, abnormal rise of the output voltage (or generation of an over-voltage) can be prevented from occurring.

In accordance with the invention, the output voltage may be maintained at a level approximately equal to or higher than the input voltage at all times, irrespective of whether the switching signal is supplied or not. Accordingly, the second reference voltage set up for detecting malfunction may be set to a fixed level (close to the input voltage) irrespective of the condition of the load connected. Thus, it is easy to set up the second reference voltage.

DETAILED DESCRIPTION OF THE PREFERRED EMBODIMENT

Figure 1:
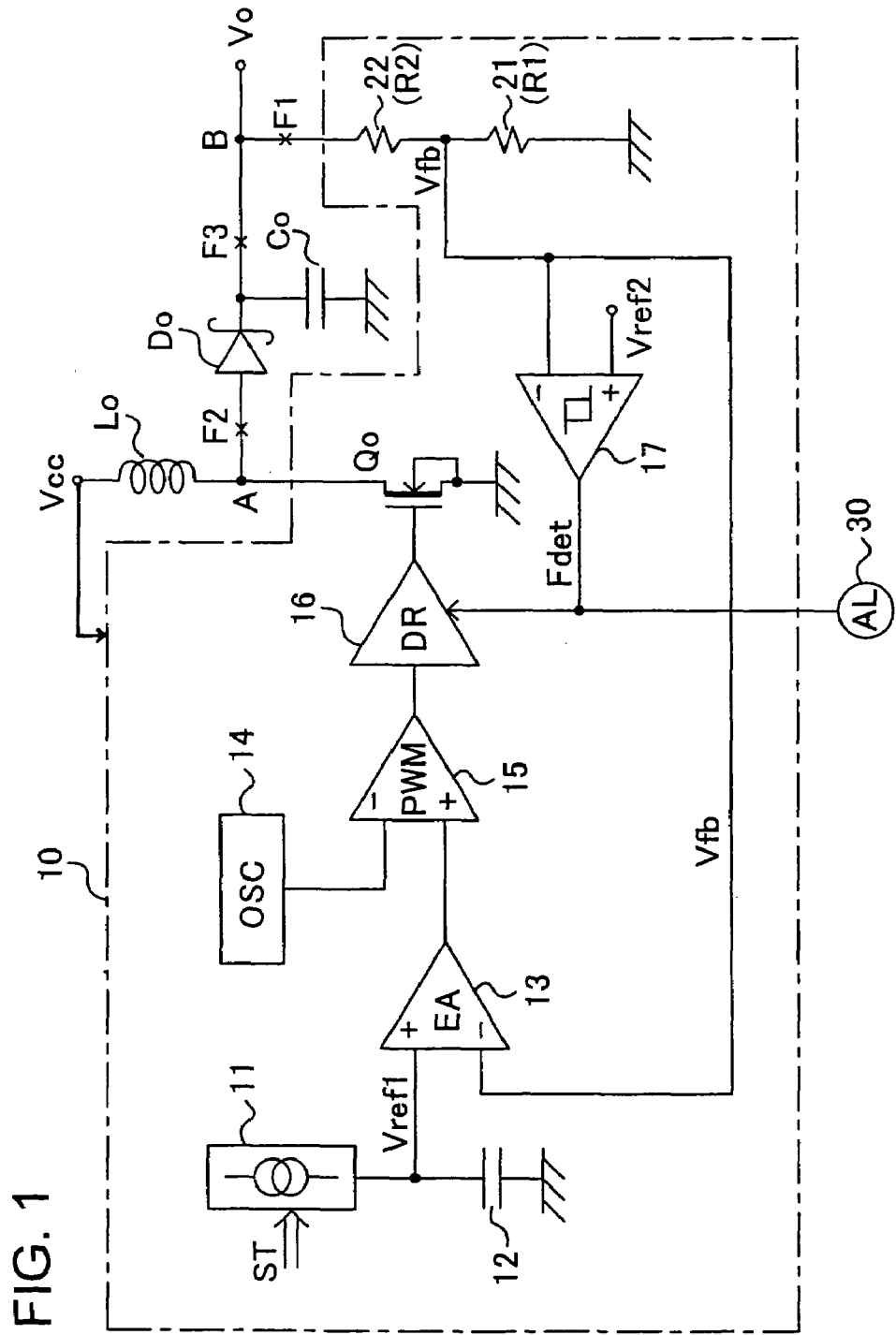
FIG. 1 is a schematic diagram showing a circuit structure of a switching power supply unit in accordance with the invention.

An inventive switching power supply unit will now be described in detail with reference to FIGS. 1 and 2. FIG. 1 shows a circuit structure of an exemplary switching power supply unit in accordance with the invention, and FIG. 2 operating characteristics of the switching power supply unit.

As shown in FIG. 1, an input voltage Vcc is supplied from an external power supply such as a battery. A coil Lo and a switch means Qo are connected in series between the input voltage Vcc and the ground. The switch means Qo is preferably a MOS transistor or a bipolar transistor. In the example shown herein, an N-type MOS transistor is used as the switch means Qo.

Connected to the serial node A of the coil Lo and the switch means Qo is the anode of a diode Do for rectifying the voltage derived from the node. An appropriate example of the rectifying diode Do is a Schottky barrier diode that exhibits a small potential drop. A smoothing capacitor Co is connected between the rectifying diode Do and the ground. Thus, the voltage appearing at the serial node A is rectified and smoothed by a rectifying and smoothing circuit consisting of the rectifying diode Do and smoothing capacitor Co. The resultant voltage Vo is supplied from an output node B of the rectifying and smoothing circuit to a load (not shown).

The coil Lo, diode Do, and capacitor Co are mostly provided as external components, and, together with the switch means Qo of the switching power supply unit IC 10 serving as a control means, constitute a switching step-up circuit. In accordance with the duty ratio of the switching signal impressed on the gate of the switch means Qo, durations of the ON- and OFF-periods of the switch means Qo may be varied to provide a desired output voltage Vo as it is stepped up from the input voltage Vcc.

In this step-up circuit, when the switching signal is not supplied (that is, when the switch means Qo is turned OFF), the capacitor Co is charged to a voltage close to the input voltage Vcc via the coil Lo and diode Do. Specifically, the capacitor is charged to the voltage equal to the input voltage Vcc minus the voltage drop Vf across the diode Do. When the diode is a Schottky diode, the voltage drop Vf across the diode Do is relatively small, which is in the range 0.2–0.4 V.

The output voltage Vo appearing at the output node B is divided by a voltage dividing circuit formed of a resistor 21 (of resistance R1) and a resistor 22 (of resistance R2) to provide a divided voltage of Vfb ($=Vo \times R1/(R1+R2)$). This divided voltage Vfb is used as a feedback voltage as well as a first detection voltage and a second detection voltage.

In the example shown herein, the switch means Qo and the resistors 21 and 22 are formed in the switching power supply unit IC 10. Alternatively, the switch means Qo and the resistors 21 and 22 can be externally provided as discrete components. When the switch means Qo and resistors 21 and 22 are externally provided to the switching power supply unit IC 10, withstand voltage of the switching power supply unit IC 10 can be lowered. The input voltage Vcc is input to the switching power supply unit IC 10 as a source voltage for its internal circuits.

Other structural features of the switching power supply unit IC 10 will now be described. A charging circuit 11 for executing soft start is connected in series with a capacitor 12. The node of the circuit 11 and capacitor 12 provides a first reference voltage Vref1. The charging circuit 11 for soft start is composed of, for example, a constant-current source circuit, which is started up upon receipt of a start signal ST. As a constant current If is supplied from the charging circuit 11 to the capacitor 12, the charge voltage of the capacitor 12, i.e. first reference voltage Vref1, gradually rises. The first reference voltage Vref1 is controlled by a voltage control circuit (not shown) to remain at a predetermined voltage as it reaches the predetermined level. The capacitor 12 may be an external capacitor to the switching power supply unit IC 10.

An error amplification circuit 13 is fed at (+) input terminal thereof the first reference voltage Vref1 and at (−) input terminal the first detection voltage or feedback voltage Vfb, and generates an error signal indicative of the difference between them.

An oscillating circuit 14 generates a triangular wave signal for pulse width modulation (PWM). Alternatively, the triangular wave signal may be a saw-tooth wave signal. A pulse width modulation circuit 15 receives at (+) input terminal thereof the error signal from the error amplification circuit 13 and at (−) input terminal the triangular wave signal from the oscillating circuit 14, and compares the two input signals to generate the PWM signal.

A driver circuit 16 receives the PWM signal from the pulse width modulation circuit 15, and generates a switching signal synchronized with the PWM signal. The switching signal is supplied to the gate of the switch means Qo. Thus, the switching signal is also a PWM signal. The driver circuit 16 is controlled by a malfunction detection signal Fdet as described below, which signal is another control signal controlling the on/off status of the driver circuit. The charging circuit 11 for soft start, capacitor 12, error amplifying circuit 13, oscillating circuit 14, pulse width modulation circuit 15, and driver circuit 16, together with the resistors 21 and 22, constitute a control circuit.

A malfunction detection comparator 17 compares the second detection voltage or feedback voltage Vfb with the second reference voltage Vref2. The malfunction detection comparator 17 generates the malfunction detection signal Fdet when the feedback voltage Vfb is smaller than the second reference voltage Vref2, and supplies the malfunction detection signal to the driver circuit 16 as described above. The second reference voltage Vref2 is preferably set to a level a little lower than the level of the feedback voltage Vfb with the switch means Qo turned OFF. That is, the second reference voltage Vref2 is set lower than (Vcc−Vf)× R1/(R1+R2).

In this way, the second reference voltage Vref2 is set to the level in association with the input voltage Vcc. Specifically, the second reference voltage Vref2 is preferably provided by dividing the input voltage Vcc input to switching power supply unit IC 10.

If the malfunction detection comparator 17 is provided with a hysteresis characteristic, fluctuations in the output voltage and influences of noise on the output voltage can be suppressed. Together with the resistors 21 and 22, the malfunction detection comparator 17 constitutes a malfunction detection circuit. The feedback voltage Vfb fed to the malfunction detection comparator 17 as the second detection voltage may be replaced by the voltage impressed on the resistor 22 (that is, the output voltage Vo).

It is noted that the malfunction detection signal Fdet may be supplied to any circuitry in the control circuit, and not limited to the driver circuit 16, since it suffices to stop the switching signal to the switch means Qo.

The malfunction detection signal Fdet may be alternatively supplied to an external alarm means 30 for alarming the generation of the malfunction detection signal Fdet. An alarm means 30 can be a display such as an LED, or a buzzer.

Operation of the inventive switching power supply unit will now be described with reference to FIGS. 1 and 2. It should be understood that variations in the output voltage Vo or the feedback voltage Vfb are omitted in FIG. 2.

Before a start signal ST is supplied to the charging circuit 11 for a soft start thereof, that is, when the switching power supply unit is in a quiescent condition, the first reference voltage Vref1 is zero, and no switching signal is supplied to the switch means Qo. Therefore, the switch means Qo is in the OFF state.

Under this condition, the capacitor Co is charged, since the input voltage Vcc is impressed on the capacitor Co via the coil Lo and diode Do. The charge voltage of the capacitor is equal to the input voltage Vcc minus the voltage drop Vf across the diode Do. The charge voltage is approximately equal to the input voltage Vcc, and is provided as the output voltage Vo. The feedback voltage Vfb is a voltage obtained by dividing the output voltage Vo by resistors R21 and R22. The first reference voltage Vref1 is zero. The second reference voltage Vref2 is always fixed to a constant level.

As a start signal ST is supplied to the charging circuit 11 for soft start at time t1, the capacitor 12 begins to be charged by a constant current, and the first reference voltage Vref1 gradually rises up, as previously described. When the first reference voltage Vref1 exceeds the feedback voltage Vfb at time t2, an error signal will be issued from the error amplification circuit 13, which signal is compared with the triangular wave signal in the pulse width modulation circuit 15 to generate a PWM signal. The PWM switching signal is supplied to the driver circuit 16 which in turn provides the switch means Qo with a switching signal, thereby allowing the output voltage Vo to rise.

The output voltage Vo and the feedback voltage Vfb rise with the first reference voltage Vref1. When the first reference voltage Vref1 reaches a predetermined reference level at time t3 for example, it levels off and is maintained at that level. Switching of the switch means Qo is controlled such that the feedback voltage Vfb becomes equal to the first reference voltage Vref1. As a consequence, the output voltage Vo is also maintained at a predetermined voltage associated with the feedback voltage Vfb and the first reference voltage Vref1.

The second reference voltage Vref2 is set to a level that is lower than the level of the feedback voltage Vfb with the switch means Qo being turned off, so that the voltage Vref2 remains lower than the feedback voltage Vfb while the switching power supply unit is resuming its steady state operation from a quiescent condition. Consequently, the malfunction detection comparator 17 does not output a malfunction detection signal Fdet under a normal operating condition.

Suppose now that an open-circuit malfunction (e.g. breaking of a lead wire or disconnection of elements) has taken place at a point F1 (referred to as malfunction point F1) in a path that leads to the voltage division resistor R2 at time t4 while the power supply unit is in a steady state operation, as shown in FIG. 1. In this case, the feedback voltage Vfb becomes zero due to the open-circuit malfunction at the malfunction point F1.

With the feedback voltage Vfb being zero, the control circuit tends to raise the duty ratio of the switching signal (or PWM control signal) supplied to the switch means Qo so as to bring the feedback voltage Vfb closer to the first reference voltage Vref1. As a consequence, the output voltage Vo tends to rise rapidly at time t4, as shown in FIG. 2 by a broken line.

In the invention, however, the rise is prevented, since at time t4 when the feedback voltage Vfb becomes zero, the second reference voltage Vref2 exceeds the feedback voltage Ffb in the malfunction detection comparator 17, which generates a malfunction detection signal Fdet. Upon receiving the malfunction detection signal Fdet, the driver circuit 16 immediately stops supplying the PWM signal to the switch means Qo, that is, shuts off the PWM signal coming from the pulse width modulation circuit 15.

It is noted that there is essentially no delay between the fall of the feedback voltage Vfb to zero at time t4 and the shutoff of the switching signal to the switch means Qo. In other words, the switching signal is stopped promptly. When the malfunction detection signal Fdet is generated, it is notified to the external alarm means 30 so as to raise an alarm in an audible and/or visible form.

Figure 2:
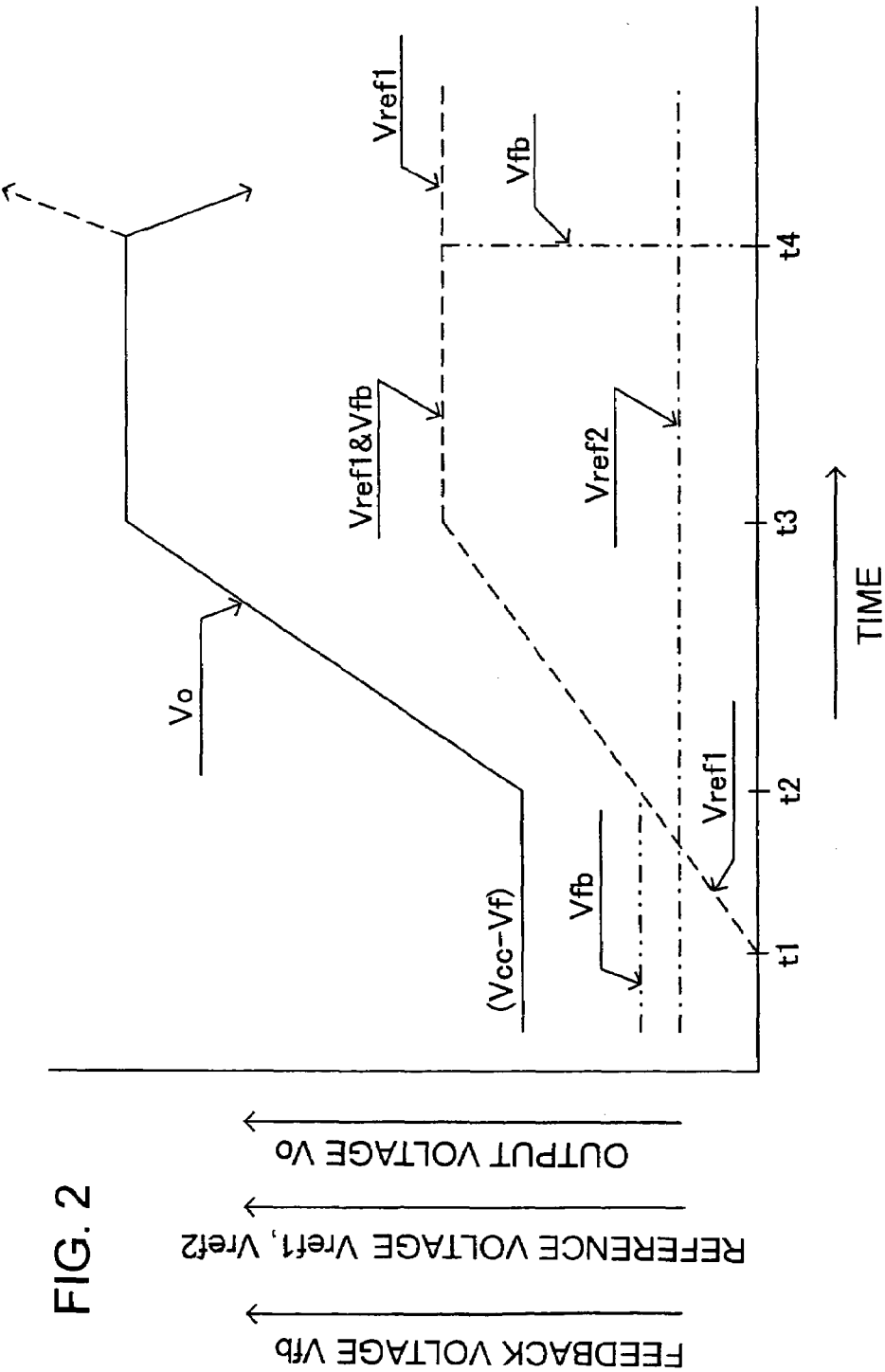
FIG. 2 is a graph showing an operating characteristic of the switching power supply unit of FIG. 1.

Thus, the output voltage Vo will not rise rapidly at time t4 as indicated by a broken line in FIG. 2, but conversely, the voltage begins to lower as indicated by a solid line. In this way, an excessive increase of the output voltage (or generation of over-voltage) can be prevented. Therefore, the switching power supply unit IC 10, and needless to say a load to which the output voltage Vo is supplied, can be of low withstanding voltage. Further, because the alarm means 30 gives warning on the occurrence of malfunction, examination of malfunction can be easily carried out.

In the case where an open-circuit malfunction has already taken place at point F1 at the time a start signal ST is impressed, a malfunction detection signal Fdet is issued from the malfunction detection comparator 17 at that time, so that the driver circuit 30 remains stopped. Accordingly, no switching signal will be supplied to the switch means Qo. In this case also, occurrence of the malfunction can be recognized from the alarm given by the alarm means 30.

It should be understood that, although open-circuit malfunction can occur anywhere else, for example at point F3 between the cathode of the diode Do and the node B where the resistor R2 is connected and at point F2 between the node A and the anode of the diode Do as shown in FIG. 1, it can be dealt with equally well in the same manner as the malfunction at point F1. Therefore, resultant over-voltage problems can be circumvented. In this way, open-circuit malfunctions that could take place at various points of lead wires and nodes of the elements such as diode Do can be safely dealt with by the invention. Further, short-circuiting in the output circuit can be dealt with in the same manner as an open-circuit malfunction as described above, thereby preventing the resultant over-current problem. Although the malfunction-preventive operation of the inventive power supply unit has been described above for the cases where malfunctions take place before the start up of the switching power supply unit or during a steady state operation thereof, such malfunction-preventive operation also works well while building up the output voltage subsequent to the start up.

It is noted that any step-up circuit can be used in the invention so long as it can step up the input voltage to a predetermined output level in accord with a switching signal, and provide an output voltage close to the input voltage when no switching signal is supplied thereto. The invention can be also applied to a charge pump step-up circuit. The charging circuit 11 for soft start has been shown in the above description to be a constant-current circuit. However, the invention is not limited to this example.

What I claim is:

1. An IC for use in a switching power unit, for outputting an output voltage by converting an input voltage to said output voltage in accordance with a switching signal supplied, but for outputting an output voltage close to said input voltage when said switching signal is not supplied, said IC comprising:
    a switch means that is on-off controlled by said switching signal;
    a control circuit for outputting said switching signal controlled in association with the voltage difference between a first detection voltage in accord with said output voltage and a first reference voltage such that said first detection voltage becomes equal to said first referenced voltage; and
    a malfunction detection circuit, adapted to
      compare a second detection voltage in accord with said output voltage with a second reference voltage; and
      generate and supply to said control circuit a malfunction detection signal to stop supplying said switching signal when said second reference voltage exceeds said second detection voltage,
    wherein said switch means is connected in series at one switch terminal thereof with a coil, and wherein said output voltage is obtained by rectifying and smoothing the voltage appearing at said switch terminal, wherein said second reference voltage is set to a level in accord with the input voltage.

2. The IC according to claim 1, wherein said second reference voltage is set to a level a little lower than the level of said second detection voltage with said switch means turned OFF.

3. A switching type power unit comprising:
    a voltage conversion circuit for outputting an output voltage by converting an input voltage to said output voltage in accordance with a switching signal supplied, but for outputting an output voltage close to said input voltage when said switching signal is not supplied;
    a control circuit for outputting said switching signal controlled in association with the voltage difference between a first detection voltage in accord with said output voltage and a first reference voltage such that said first detection voltage becomes equal to said first reference voltage; and
    a malfunction detection circuit, adapted to
      compare a second detection voltage in accord with said output voltage with a second reference voltage; and
      generate and supply to said control circuit a malfunction detection signal to stop supplying said switching signal when said second reference voltage exceeds said second detection voltage,
    wherein said voltage conversion circuit comprises:
      a coil;
      a switching means that is connected in series with said coil and is on-off controlled by said switching signal; and
      a rectifying and smoothing circuit for rectifying and smoothing the voltage at the serial node of said coil and switching means,
    wherein said second reference voltage is set to a level in accord with the input voltage.

4. The switching power unit according to claim 3, wherein said second reference voltage is set to a level a little lower than the level of said second detection voltage with said switch means turned OFF.

5. The switching power unit according to claim 4, wherein said malfunction detection circuit comprises a comparator for comparing said second detection voltage and second reference voltage to generate said malfunction signal.

6. The switching power unit according to claim 4, further comprising an alarm means for alarming the generation of a malfunction detection signal.

7. The switching power unit according to claim 4, wherein said control circuit outputs said switching signal with the duty ratio thereof controlled by said voltage difference.

8. The switching power unit according to claim 4, wherein said first reference voltage increases gradually from a starting voltage to a predetermined voltage in response to a start signal.

9. The switching power unit according to claim 4, wherein said first and second detection voltages are the same in magnitude.

* * * * *